United States Patent
Robertson

(12) 
(10) Patent No.: US 6,463,274 B1
(45) Date of Patent: Oct. 8, 2002

(54) MULTIPLE CLASS OF SERVICE DETERMINATION FOR DIGITAL CELLULAR TELEPHONES

(75) Inventor: Dan Robertson, Encinitas, CA (US)

(73) Assignee: Denso Corporation, Aichi-Ken (JP)

( * ) Notice: Subject to any disclaimer, the term of this patent is extended or adjusted under 35 U.S.C. 154(b) by 0 days.

(21) Appl. No.: 09/427,887

(22) Filed: Oct. 26, 1999

(51) Int. Cl.$^7$ .............................................. H04M 11/00
(52) U.S. Cl. ........................ 455/406; 455/407; 455/414
(58) Field of Search .......................... 455/406, 62, 407, 455/408, 405, 414, 426

(56) References Cited

U.S. PATENT DOCUMENTS

| | | | | |
|---|---|---|---|---|
| 5,303,297 A | * | 4/1994 | Hillis ........................... | 455/406 |
| 5,414,796 A | * | 5/1995 | Jacobs et al. ................. | 395/2.3 |
| 5,649,299 A | * | 7/1997 | Battin et al. ................... | 455/62 |
| 5,983,114 A | * | 11/1999 | Yao et al. ..................... | 455/509 |
| 6,005,855 A | * | 12/1999 | Zehavi et al. ................ | 370/335 |
| 6,374,112 B1 | * | 4/2002 | Widegren et al. ........... | 455/452 |

\* cited by examiner

*Primary Examiner*—Daniel Hunter
*Assistant Examiner*—Thuan T. Nguyen
(74) *Attorney, Agent, or Firm*—Fish & Richardson P.C.

(57) ABSTRACT

Digital cellular telephone with a variable rate vocoder is used with a number of different classes of service. A first class of service provides always constant bit rate to the telephone. A second class of service is the variable bit rate which changes the class of service depending on the traffic on the system. A third class of service is always-degraded service at a presumable lower price.

4 Claims, 1 Drawing Sheet

MULTIPLE CLASS OF SERVICE DETERMINATION FOR DIGITAL CELLULAR TELEPHONES

BACKGROUND

Digital cellular telephones often operate using a voice coding system or "vocoder". The voice coding system analyzes incoming voice, searches a codebook including to find the codebook excitation that can best synthesize the incoming voice and appropriately digitizes the voice. The voice can be digitized using multiple rates. Variable rate vocoders are well known.

A recent trend in voice coding development is a multi-mode variable rate vocoder. In such a system, such as ETSI's adaptive multi-rate vocoder (AMR) and the Telecommunication Industry Association (TIA) selectable mode vocoder ("SMV") system, different speech quality settings are possible. For example, the speech settings can include high, medium and low. The different speech settings get different vocoders associated with them. The system may adaptively set these vocoders based on the amount of usage. For example, if the system is being under utilized, each user may get more quality of service. However, during peak times, each user may get lower quality of service.

SUMMARY

The present system recognizes that a user may be willing to pay more money for a higher quality of service. Accordingly, the present system defines quality of service options where customers can pay higher rates for higher quality service and be insured that higher quality service. Conversely, this system enables customers to pay lower rates for reduced rate service.

BRIEF DESCRIPTION OF THE DRAWINGS

These and other aspects will be described in detail with reference to the accompanying drawings, wherein.

DETAILED DESCRIPTION

Figure 1:
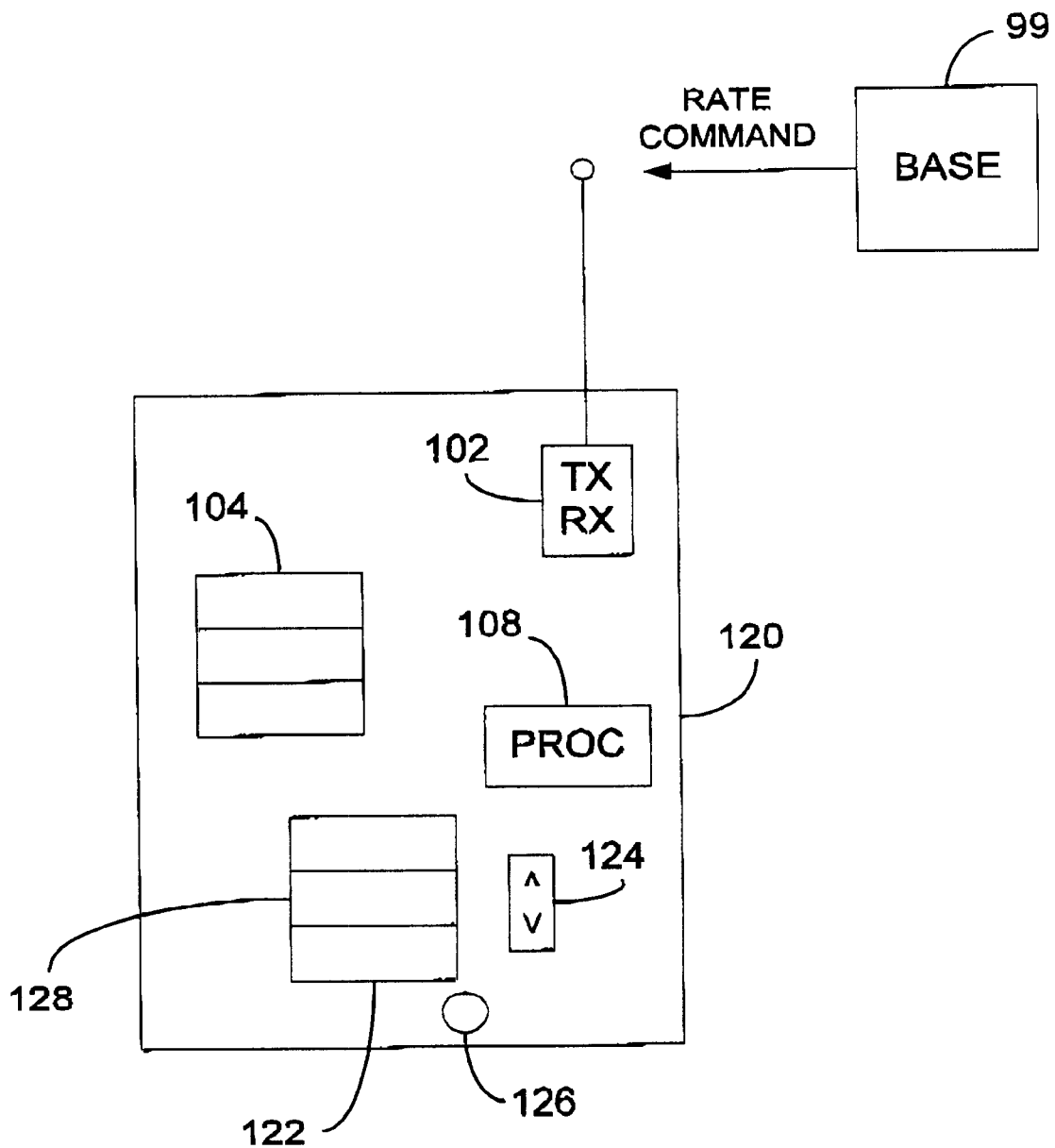
FIG. 1 shows a block diagram of a cellular telephone with a variable rate vocoder.

The present system operates on a multi rate vocoding system as shown in FIG. 1. The phone 100 includes a cellular transceiver 102 that communicates with a remote base station. One of the information items that is received is a rate command 110.

A multi rate vocoder 104, which can be one or several vocoders, receives the rate command and selects a quality of service accordingly.

According to the present paradigm, each customer pays for a specified rate of service. The highest quality of service rate according to this system or HQS is the most expensive rate. In this quality of service rate, the system will never reduce the vocoder setting to that user. Therefore, this cellular connection will always occur at the highest possible quality rate.

In intermediate quality of service levels, the system operates similarly to the current processes. The system dynamically assigns each of the intermediate customers' vocoders with the highest possible bit rate based on the current state of the cellular system. The base station shown as 99 in FIG. 1, assesses the amount of traffic on the cellular network. When the amount of traffic becomes too high, the system will need to reduce the amount of information. Therefore it sends the rate command signal 110 to each intermediate quality of service user who is currently on the system, telling that user handset to reduce its bit rate. The handset then selects a lower quality vocoder which produces less information and therefore reduces the load on the system.

According to the paradigm, the lowest quality of service level is always in the reduced bit rate mode—even when the amount of traffic on the system is minimal. This rate of service can be offered for instance to economy users. Current cellular plans, for example, often offer special rates to those who want to pay less and use the cellular telephone only in emergencies or the like. This could be one more way reduce the call costs.

This scheme also contemplates a one time increase option. The user interface 120 of the telephone includes a display 122, and menu-activating keys 124, 126. Before placing a call or during a call, the user selects the "one time increase" selection shown as 128. This sends a specified signal to the base station indicating that the user has requested an increased level on a single call basis. This can be billed to the user as a one time charge for the call. Hence, if the user is having a very important call, they may request higher quality for that call at an increased price.

An alternative way of selecting this is via entry of a specified code. For the example, the user may enter *99 and send telling the base station that the next call that comes in or is placed, or the current call should be made at one of the higher bit rate levels.

All of these operations can be carried out in the phone by the telephone-controlling processor 108 and in the base station by the billing computer.

Other embodiments are within the disclosed embodiment.

What is claimed is:

1. A method of operating a cellular telephone system, comprising:
    establishing at least first and second classes of service;
    providing constant bit rate service to said first class of service; and
    providing variable rate service to said second class of service, wherein said variable rate service provides better service when the system is less busy, and degraded service when the system becomes more busy;
    requesting a user-selectable one-time increase in class of service, and providing said constant bit rate service after said one-time increase is requested, such that a higher quality of service is provided; and
    billing for said first and second class of services, a billing for said first class of service being at a higher rate than a billing for said second class of service.

2. A method as in claim 1, wherein requesting a user-selectable one-time increase includes entering a predetermined code corresponding to the requested constant bit rate service.

3. A method as in claim 1, wherein requesting a user-selectable one-time increase includes selecting the requested constant bit rate service from a menu.

4. A cellular telephone system comprising:
    a cellular handset having a multiple rate vocoder; and
    a controller for said cellular handset, said controller controlling said cellular handset to operate in a first mode in which constant bit rate service is available at all times for a first class of service, and in a second mode in which variable rate service is provided depending an amount of traffic on said system, the controller, responsive to a user request, to request a one-time increase in class of service to the constant bit rate service, such that a higher quality of service is provided.

* * * * *